United States Patent [19]

Roubinet et al.

[11] 4,278,282

[45] Jul. 14, 1981

[54] ELASTIC GUARD BRACES FOR ATTACHING BUMPERS TO AUTOMOBILES

[75] Inventors: Pierre Roubinet, Rueil-Malmaison; Marcel Goupy, Saint-Cloud, both of France

[73] Assignee: Regie Nationale des Usines Renault, Boulogne-Billancourt, France

[21] Appl. No.: 115,096

[22] Filed: Jan. 24, 1980

[30] Foreign Application Priority Data

Jan. 26, 1979 [FR] France .............................. 79 02015

[51] Int. Cl.³ .......................................... B60R 19/04
[52] U.S. Cl. ................................... 293/132; 293/135; 188/1 C
[58] Field of Search ............... 293/132, 133, 135, 136, 293/120; 188/1 C

[56] References Cited

U.S. PATENT DOCUMENTS

| 3,721,433 | 3/1973 | Sobel | 188/1 C |
| 4,029,350 | 6/1977 | Goupy | 293/133 |
| 4,154,469 | 5/1979 | Goupy | 293/133 |

FOREIGN PATENT DOCUMENTS 2364788  4/1978  France .

Primary Examiner—Robert R. Song
Attorney, Agent, or Firm—Oblon, Fisher, Spivak, McClelland & Maier

[57] ABSTRACT

An elastic guard brace for attaching bumpers to an automobile is disclosed. The brace consists of a relatively thick elastic member which is connected between the bumper and the automobile and is oriented so that the direction of its elasticity is parallel to the direction of a force acting on the bumper. At least one inelastic member is positioned within the elastic member and is oriented parallel to the direction of the force acting on the bumper so that it can buckle in an inelastic manner and absorb energy upon impact. The elasticity of the elastic member minimizes the inelastic deformation of the elastic element and returns the bumper to its original position.

10 Claims, 16 Drawing Figures

ELASTIC GUARD BRACES FOR ATTACHING BUMPERS TO AUTOMOBILES

BACKGROUND OF THE INVENTION

Recent developments in the design of automobile bumpers or protectors have led manufacturers to construct these parts from thermoplastic or thermosetting materials using designs which enable these devices to undergo elastic deformations in low speed collisions. Upon return to their intial form, the bumpers should not show notable traces of the rigors to which they have been submitted.

Difficulties remain in mounting these parts on the vehicle, since when they are attached by means of metal guard braces, as is frequently the case, these guard braces assume permanent deformations at the moment of impact. As a result, even when the bumper remains apparently intact, its position with respect to the chassis is changed and shows in a permanent way that damage has been suffered.

SUMMARY OF THE INVENTION

The object of the present invention is to propose an economical way of constructing one-piece guard braces which would enable elastic behavior to be obtained up to a given force and, beyond said force, to effect an absorbtion of energy by one of the constituent elements assuming permanent deformation, and, finally, at the moment of load-release, to effect elimination of a large part of said permanent deformation by virtue of the elastic element functioning as a spring.

Such a device, combining a spring function and a shock absorbing function, can be easily constructed in several pieces, but one of the characteristics of the invention lies in the simultaneous obtainment of these two functions in a single molded piece made of thermoplastic material such as polyolefin, polyamide, polyoxymethylene, polyester, etc., the latter being cited as non-limitative examples.

In principle, such piece has as its elastic spring-acting element a relative thick curved portion (2-8 mm thick) capable of beinding elastically over its entire form, designed in such a way that one of its ends may be made integral with the chassis and the other affixed to the bumper. The shock-absorbing element is constituted by relatively thin (0.5-2 mm) flat partitions which work by buckling in a controlled manner, either through their connection with the curved elastic element or by possible complementary application of rigidifying fins.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
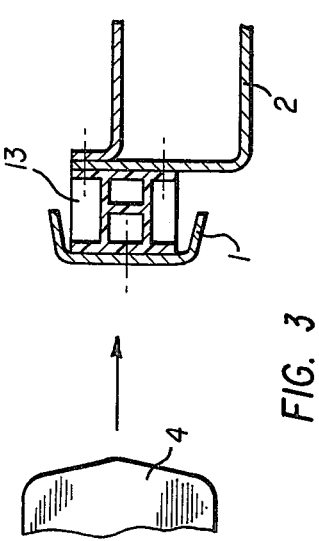
FIG. 1 is an elevational view of a prior art bumper mounting.

FIG. 1 shows a bumper 1 connected to structure 2 of an automobile by means of a U-shaped metal part 3.

Using ram 4, successive forces are exerted in the direction of the arrow, thereby imposing a series of deformations under a given load.

Figure 2:
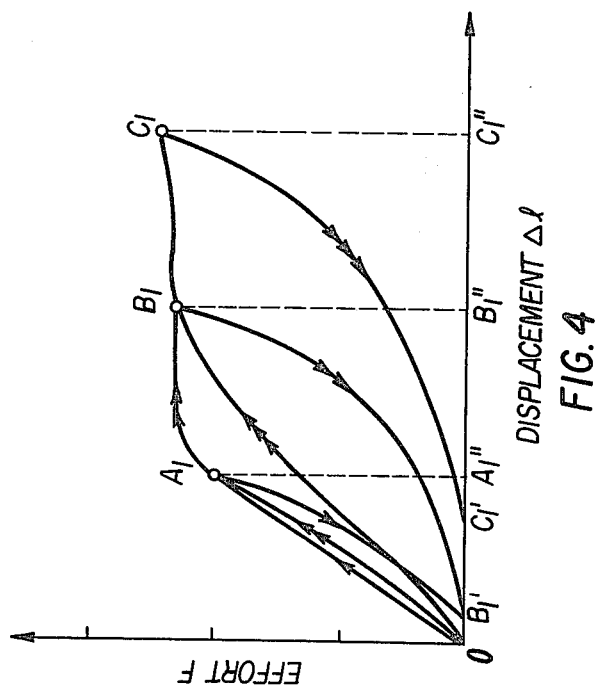
FIG. 2 is the diagram of forces undergone by the bumper as mounted in FIG. 1, together with its corresponding displacements.

FIG. 2 shows a diagram resulting from the preceding operation for three experimental cycles, giving rise to deformations of parts 3, labelled OA", OB" and OC" respectively.

In the first cycle, under limited stress leading to deformation OA", the system remains in the nearly elastic phase, although already there appears a non-negligible permanent deformation OA' following withdrawal of the force. A second cycle leads to B, corresponding to a slight increase in force and a larger permanent deformation OB'. Similarly, the third cycle leads to C, with considerable permanent deformation OC'.

Figure 3:
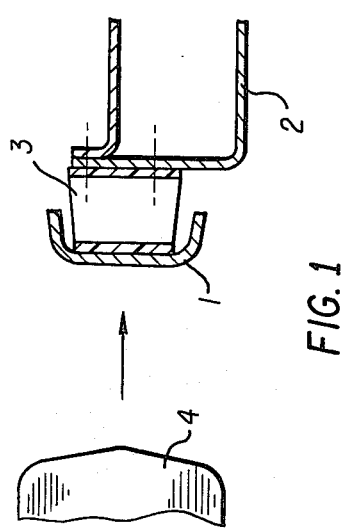
FIG. 3 is an elevational view of a bumper mounting according to the invention.
Figure 4:
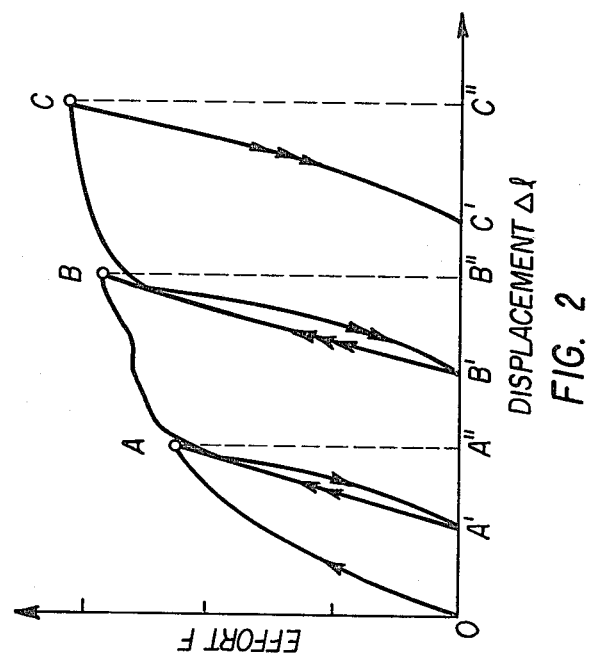
FIG. 4 is the diagram of forces undergone by the bumper of the invention, together with its corresponding displacements.

In FIG. 3, metal plate part 3 is replaced by a guard brace 13 according to the invention, which shall be described in detail below. Repeating the previous three-cycle experiment, a new diagram (FIG. 4) is obtained.

It will be observed that in the first, limited stress cycle, the plastic part, remaining in the elastic zone, enables curve OA1 to be described with a return to the origin following withdrawal of the force.

In the second cycle, the increased force necessary to induce the required deformation under load leads to a buckling of the flat walls, with the beginning of permanent deformation, compensated by the elastic return of the thick sections of the piece, which have remained in their zone of elastic operation.

In the following cycle, it can be observed that the onset of folding of the flat partitions by buckling entails a loss of rigidity which prevents the rise in force. Diagram B1', B1, C1 is described at essentially constant force and corresponds to good energy absorbtion. Return is effected at C1, with permanent deformation limited by the elastic return of the thick sections.

It can thus be seen that, by association in the same piece of one or more thick elements, deforming in elastic fashion over their entire form, with one or more thin elements capable of assuming temporarily permanent deformations which are partially cancelled by return of the elastic elements, an advantageous energy absorbtion diagram may be obtained while at the same time retaining a more or less unchanged configuration of the parts after each force cycle. It has been observed that for this purpose, the favorable thickness ratios between thick elements and thin elements is on the order of 4 to 5, with said ratios being capable of being between 2 and 10 in particular cases.

Figure 5A:
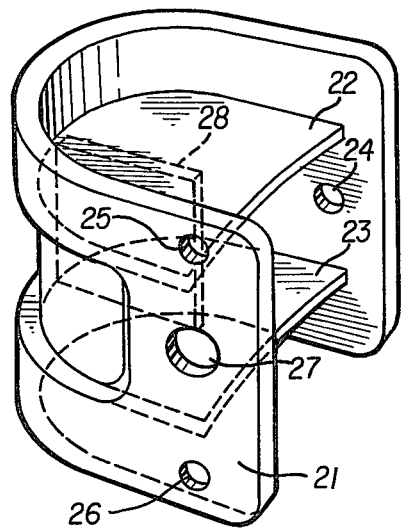
FIGS. 5a, 5b, 5c are perspective views of a guard brace according to the invention, together with elevational and plan views.
Figure 5B:
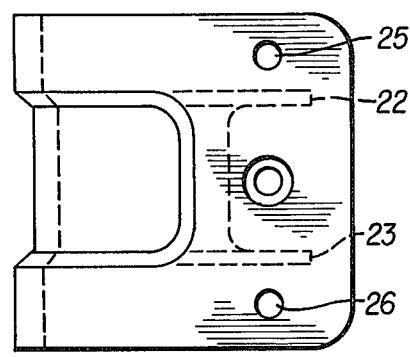
Figure 5C:
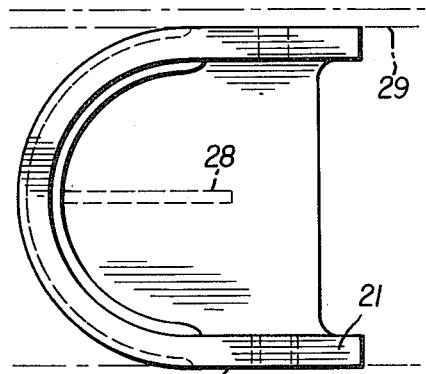

The example guard brace of the invention as illustrated in detail in FIGS. 5a, 5b and 5c comprises a thick element forming elastic spring 21 having a semi-circular section inside, of which are located at least two thin, transverse partitions 22 and 23 forming a shock absorbing device which is staggered by buckling, holes 24, 25 and 26 for attaching the guard brace on one side to the bumper and on the other to the structure, and a hole 27 capable of serving as a passage for a wrench or screwdriver to reach the nut or bolt effecting fastening at 24.

The two thin partitions 22 and 23 may possibly be made integral by a connecting fin 28, increasing the rigidity of the assembly.

The guard brace is disposed as indicated in FIG. 5c, with the bumper attached at 29 and the preceding assembly made integral with the vehicle at 30.

Figure 6A:
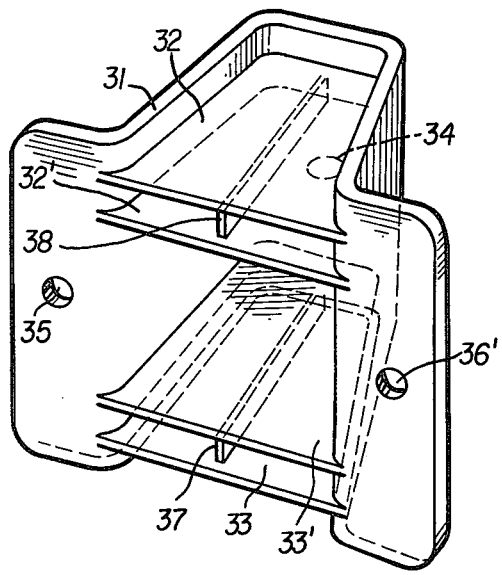
FIGS. 6a, 6b, 6c are a first variant of a guard brace according to the invention, in perspective, elevational and plan views.
Figure 6B:
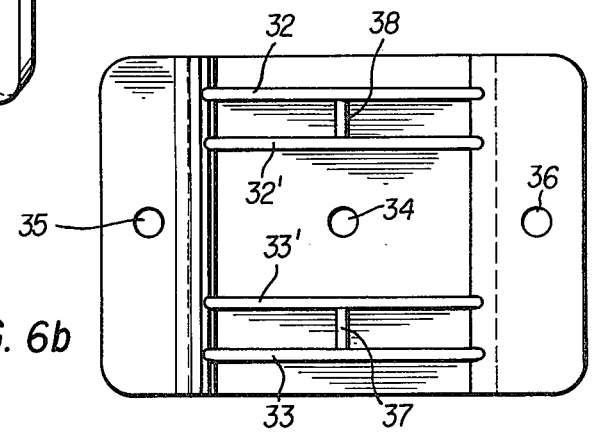
Figure 6C:
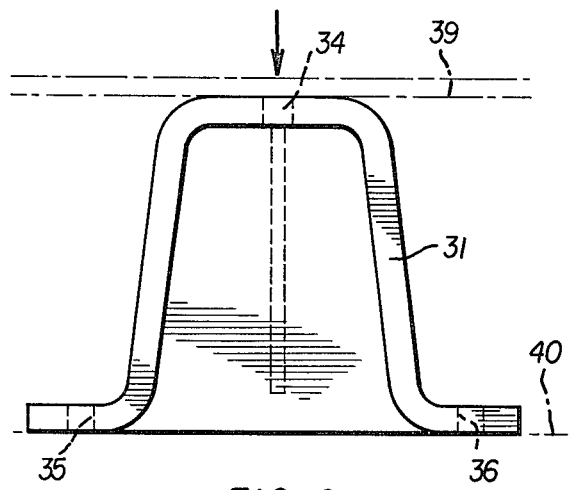

The first variant of the invention shown in FIGS. 6a, 6b and 6c is disposed on the vehicle in a manner analogous to the preceding embodiment (see FIG. 6c). Thick elastic element 31 has a U-shaped section, the closed part of which is directed toward bumper 39 of the vehicle and the opposite part terminating in tabs fastened to vehicle chassis 40.

Thin, transverse partitions 32—32' and 33—33' are double layered and are interconnected by rigidifying fins 37 and 38. Attachment holes 34, 35 and 36 are provided in the wall of thick elastic element 31.

Figure 7A:
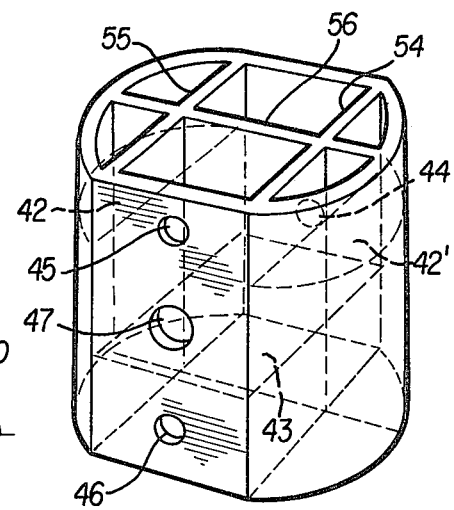
FIGS. 7a, 7b, 7c are analogous views of a second variant of the invention.
Figure 7B:
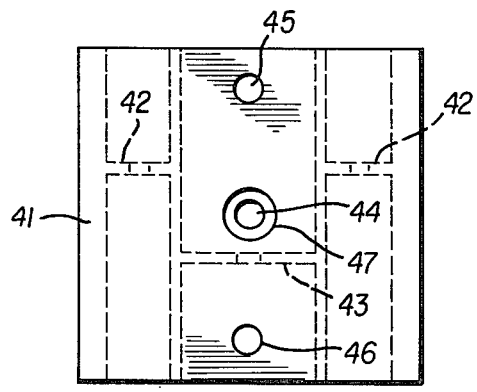
Figure 7C:
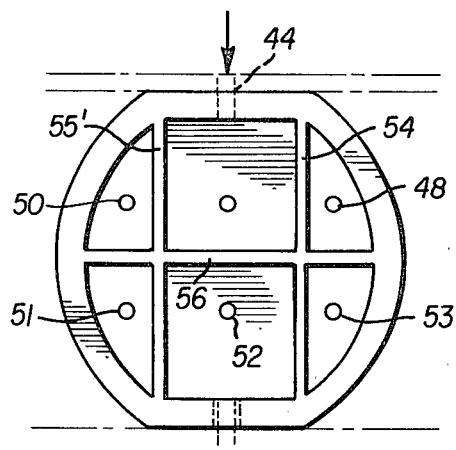

The second variant of the invention is represented in FIGS. 7a, 7b and 7c. As seen in FIG. 7c, it is integrated with the vehicle in a manner analogous to that described earlier for FIGS. 5c and 6c.

The shape of thick element 41 having an elastic function is in this case closed in cross-section, has semicircular portions, and has parallel half-flats facing the bumper and the part of the body with which it comes into contact.

The presence of vertical rigidifying walls 54, 55 and 56, of fastening holes 44, 45 and 46, and of opening 47 intended to permit a tool to reach hole 44 facing it, will be noted. With regard to the hole 44, partitions 42—42' and 43 are offset. Holes 48 to 53 are intended to avoid retention of rain water in the chambers.

Figure 8A:
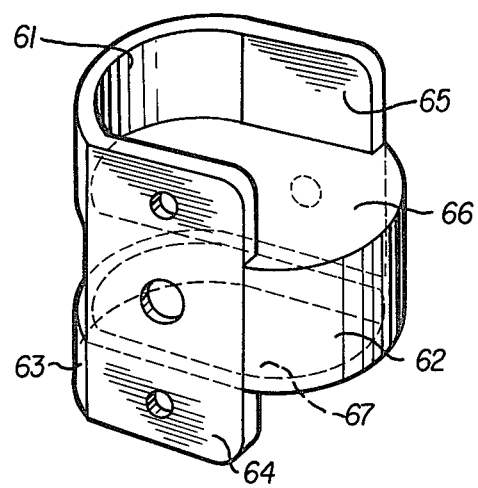
FIGS. 8a, 8b, 8c are analogous views of a third variant of the invention.
Figure 8B:
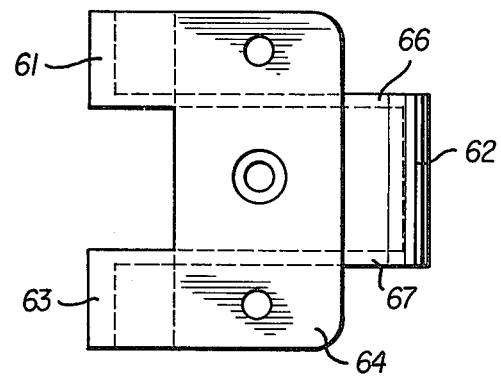
Figure 8C:
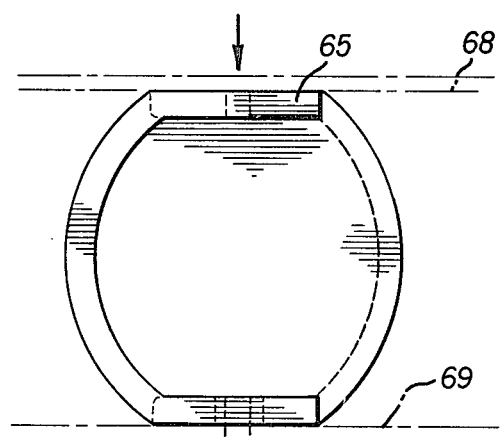

Another variant is described, illustrated in FIGS. 8a, 8b and 8c, according to which the shape of the thick elastic element is obtained by superimposing several (preferably three) alternately reversed half-rings 61, 62 and 63, interconnected at their common flat surfaces 64, 65. Collapsible thin, flat partitions 66, 67 are perpendicular to, and located at the joints of, the latter. The assembly thus constituted, as in the preceding representation, includes openings through which fastening elements may pass and through which access to said elements may be had, and is located in analogous fashion between bumper 68 and chassis 69.

It should further be noted that in all of the preceding cases permanent deformation due to the buckling of the thin elements is greatly minimized by the elastic return of the thick elements.

Obviously numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A guard brace for the attachment of an automobile bumper to an automobile, said brace comprising in combination:
   at least one relatively thick elastic element fixed to said bumper and to said automobile, said elastic guard element being oriented so that the direction of elastic deformation thereof is parallel to the direction of a force acting on said bumper; and
   at least one relatively thin inelastically deformable element fixed to at least one of said at least one elastic elements:
   the relative thickness of said relatively thick elastic element and said relatively thin inelastically deformable element being such that the elastic resilience of said elastic element substantially returns said bumper to an initial shape following the inelastic deformation of said inelastically deformable element,
   whereby said at least one inelastic element buckles to absorb the energy of said force while the elasticity of said at least one elastic element minimizes the deformation of said inelastic element.

2. The brace of claim 1 wherein said guard brace is comprised of one piece, molded, thermoplastic material.

3. The brace of claim 2 wherein said material is polyamide.

4. The brace of claim 1 wherein said at least one relatively thick element is between 2 and 10 times as thick as said relatively thin element.

5. The brace of claim 1 wherein said at least one relatively thick element is between 4 and 5 times as thick as said relatively thin element.

6. The brace of claim 1 or 2 or 4 including mounting, draining and access holes located in said brace.

7. A guard brace for the attachment of an automobile bumper to an automobile, said brace comprising in combination:
   at least one relatively thick elastic element fixed to said bumper and to said automobile, said elastic guard element being oriented so that the direction of elastic deformation thereof is parallel to the direction of a force acting on said bumper; and
   at least one relatively thin inelastically deformable element fixed to at least one of said at least one elastic elements;
   whereby said at least one inelastic element buckles to absorb the energy of said force while the elasticity of said at least one elastic element minimizes the deformation of said inelastic element;
   wherein each said at least one elastic element has a semicircular section having an axis and at least two of said at least one inelastic elements comprise partitions extending within said section in a plane perpendicular to said axis, and including at least one fin connecting said at least two inelastic elements.

8. A guard brace for the attachment of an automobile bumper to an automobile, said brace comprising in combination:
   at least one relatively thick elastic element fixed to said bumper and to said automobile, said elastic guard element being oriented so that the direction of elastic deformation thereof is parallel to the direction of a force acting on said bumper; and
   at least one relatively thin inelastically deformable element fixed to at least one of said at least one elastic elements;

whereby said at least one inelastic element buckles to absorb the energy of said force while the elasticity of said at least one elastic element minimizes the deformation of said inelastic element;

wherein each said at least one elastic element has a U-shaped section, the legs of said U including tabs adapted for connection to said automobile and wherein said at least one inelastic element comprises at least one pair of elements extending between said legs, the elements of each of said at least one pair being connected by transverse fins.

9. A guard brace for the attachment of an automobile bumper to an automobile, said brace comprising in combination:

at least one relatively thick elastic element fixed to said bumper and said automobile, said elastic guard element being oriented so that the direction of elastic deformation thereof is parallel to the direction of a force acting on said bumper; and at least one relatively thin inelastically deformable element fixed to at least one of said at least one elastic elements;

whereby said at least one inelastic element buckles to absorb the energy of said force while the elasticity of said at least one elastic element minimizes the deformation of said inelastic element;

wherein said at least one elastic element comprises a single element forming in section a pair of opposed semi-circles having parallel axes and connected at their ends by flats and wherein said at least one inelastic element comprises at least one first partition located between said semi-circles and extending parallel to said axes and at least one second partition extending between said semi-circles transverse to said axes.

10. A guard brace for the attachment of an automobile bumper to an automobile, said brace comprising in combination:

at least one relatively thick elastic element fixed to said bumper and to said automobile, said elastic guard element being oriented so that the direction of elastic deformation thereof is parallel to the direction of a force acting on said bumper; and at least one relatively thin inelastically deformable element fixed to at least one of said at least one elastic elements;

whereby said at least one inelastic element buckles to absorb the energy of said force while the elasticity of said at least one elastic element minimizes the deformation of said inelastic element;

wherein said elastic element comprises an axial array of at least three alternately reversed half rings in section having parallel axes and flat ends, and interconnecting at said flat ends, and wherein said at least one inelastic element comprises a partition extending transverse to said axes and located in the axial direction at each of said interconnections.

* * * * *